US008639401B2

(12) United States Patent
Bailey et al.

(10) Patent No.: US 8,639,401 B2

(45) Date of Patent: Jan. 28, 2014

(54) DYNAMIC ADAPTATION OF TRIGGER THRESHOLDS TO MANAGE WHEN DATA MESSAGES ARE TRANSMITTED

(75) Inventors: Louis J. Bailey, Covington, WA (US); Ryan D. Hale, Kent, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/237,358

(22) Filed: Sep. 20, 2011

(65) Prior Publication Data

US 2013/0073120 A1 Mar. 21, 2013

(51) Int. Cl.
*G06F 19/00* (2011.01)
*G08G 5/00* (2006.01)

(52) U.S. Cl.
CPC ............ *G08G 5/0013* (2013.01); *G08G 5/0021* (2013.01)
USPC ...................................... 701/14; 701/2; 701/3

(58) Field of Classification Search
None
See application file for complete search history.

(56) References Cited

U.S. PATENT DOCUMENTS 6,828,921 B2 * 12/2004 Brown et al. ................. 340/945
7,177,731 B2 * 2/2007 Sandell et al. .................... 701/3
7,349,773 B2 3/2008 Berard
7,433,779 B2 10/2008 Deker et al.
7,729,263 B2 * 6/2010 True et al. ..................... 370/238
7,797,102 B2 9/2010 Fortier
8,121,140 B2 * 2/2012 McGuffin et al. ............. 370/431
8,131,407 B1 * 3/2012 Robinson .......................... 701/3
2002/0039072 A1 4/2002 Gremmert et al.
2008/0288164 A1 11/2008 Lewis et al.
2009/0012663 A1 1/2009 Mead et al.
2009/0083368 A1 * 3/2009 Stayton et al. ................ 709/202
2009/0157288 A1 6/2009 Bailey et al.
2010/0049378 A1 2/2010 Hiale-Guilhamou et al.
2010/0049382 A1 2/2010 Akalinli et al.
2010/0241345 A1 9/2010 Cornell et al.
2011/0050458 A1 3/2011 Bailey et al.
2011/0054718 A1 3/2011 Bailey
2011/0121999 A1 * 5/2011 Sandell et al. ................ 340/971
2012/0072990 A1 * 3/2012 Gutt et al. ....................... 726/25

FOREIGN PATENT DOCUMENTS

EP 1965513 A2 9/2008
EP 2023685 A1 2/2009

OTHER PUBLICATIONS

Coppenbarger et al., "Real-Time Data Link of Aircraft Parameters to the Center-TRACON Automation System (CTAS)", Proceedings of the 4th USA/Europe ATM R&D Seminar, Dec. 2001, pp. 1-11.*

(Continued)

*Primary Examiner* — James Trammell
*Assistant Examiner* — Todd Melton
(74) *Attorney, Agent, or Firm* — Ostrager Chong Flaherty & Broitman P.C.

(57) ABSTRACT

Systems and methods for remotely setting a value for a trigger threshold variable used by a processor unit onboard an aircraft to determine if and when a data message should be transmitted from the aircraft. The method comprises the following steps performed by a computer: (a) obtaining data representing a flight plan or flight trajectory of the aircraft and flight information; (b) obtaining data representing business considerations; (c) computing a value of the trigger threshold variable as a function of at least the flight plan or flight trajectory data and the business considerations data; and (d) constructing a trigger threshold data message containing the computed value of the trigger threshold variable.

22 Claims, 3 Drawing Sheets

(56) References Cited

OTHER PUBLICATIONS

Hunter et al., "Preliminary Investigation of Trajectory Prediction Impact on Decision Support Automation", IEEE/AIAA 28th Digital Avionics Systems Conference, Oct. 2009, pp. 3.B.2-11.*

Jackson et al., "Airborne Technology for Distributed Air Traffic Management", Proceedings of the 44th IEEE Conference on Decision and Control and the 2005 European Control Conference, Dec. 2005, pp. 3947-3954.*

Lester et al., "Benefits and Incentives for ADS-B Equipage in the National Airspace System", Massachusetts Institute of Technology, Aug. 2007, pp. 1-156.*

Mondoloni et al., "Trajectory Modelling Accuracy for Air traffic Management Decision Support Tools", 23rd International Congress of the Aeronautical Sciences, Sep. 2002, pp. 1-10.*

Tamvaclis et al., "Use of Aircraft Derived Data for More Efficient ATM Operations", The 23rd Digital Avionics Systems Conference, Oct. 2004, pp. 3.B.4-1-12.*

Extended European Search Report, European Patent Application No. 12185111.7, Nov. 22, 2013.

* cited by examiner

DYNAMIC ADAPTATION OF TRIGGER THRESHOLDS TO MANAGE WHEN DATA MESSAGES ARE TRANSMITTED

BACKGROUND

The embodiments disclosed hereinafter generally relate to methods for automated transmitting of data messages from an aircraft. In particular, the disclosed embodiments relate to methods for automatically transmitting data messages in response to a parameter attaining a value equal to or in excess of a trigger threshold.

Various digital datalink systems for transmission of messages between aircraft and ground stations via radio or satellite are known, including the Aircraft Communications Addressing and Reporting System (ACARS). ACARS-equipped aircraft have an avionics computer called an ACARS. Management Unit (MU), which is directly interfaced to a Control Display Unit (CDU) in the cockpit. There is a datalink interface between the ACARS MU and the flight management system (FMS). Each airline has its own unique ACARS application operating on its aircraft. In addition, since each airline's computers are different, the content and format of messages sent by an ACARS MU differs for each airline.

An ACARS message typically comprises a header containing an aircraft identifier, a payload containing aircraft calculated and measured data and a cyclic redundancy check. The message is constructed in a user message format specified by the recipient of the message and in accordance with a dynamically settable user configuration stored in a subscriber database. This user configuration specifies which functions or processes are running in parallel, and also defines connections to receive and transmit the data. The user configuration also specifies the behavior of the application. The user message format generally pertains to the order and type of data and usually does not encompass the behavior of the application.

ACARS is a system for transmission of data messages between aircraft and ground stations via radio (VHF or HF) or satellite. ACARS messages are transmitted to and from aircraft before, during and after flights. For example, the aircraft sends in-flight reports on position, altitude, speed, outside temperature, wind, fuel, engine performance, etc over AGARS. The system automatically selects the communication means based on available links and avionics selection policies, which may take into consideration factors such as cost, performance and availability.

It is known to program a flight management computer to automatically trigger the sending of a data message when a preset value of a trigger threshold variable has been reached or exceeded. During each flight, a data message is transmitted every time the trigger threshold variable increases from a value below the preset value to a value equal to or exceeding the preset value.

Because the messaging service is typically provided by a data link service provider that is independent of the airline operating the aircraft, there is a communications cost to the airline associated with each message. Data link service providers use a variety of different air-to-ground data links (VHF, HF and satellite). As a flight progresses, the aircraft's mode of communication may change from VHF to HF or from VHF to SATCOM. When such a communication transition occurs, often the communication costs can greatly increase for the airline or data link service provider.

Previously, an arbitrary value was chosen and set prior to the aircraft departure. The value of the trigger threshold variable was not dynamically set per flight. Typically, one value was used for an aircraft type and airline and was not altered. This resulted in inefficient use of the aircraft communication assets as well as flight management computer processing resources.

An adaptive solution is needed that can reset or set the value of the trigger threshold variable to reduce, limit, schedule or increase aircraft communication based on the current aircraft environment and the current airline costs.

SUMMARY

Systems and methods are disclosed for remotely setting a value of a trigger threshold variable onboard an aircraft based on the dynamic conditions of a particular flight. A flight typically commences with a default value of the trigger threshold variable. The system disclosed herein first determines the current value (which may be different than the default value if there has been no power interruption) and then sets a new value (or resets the default value) based on current business considerations, phase of flight, user preferences or operation of that particular flight. The trigger threshold variable value can be set or reset many times as a flight progresses through multiple airspaces and communication networks, which will affect the cost scheme for that flight. The system is sufficiently dynamic to respond to manual and automated requests.

The methodology disclosed hereinafter provides a service that enables an airline to reduce, limit, schedule or increase aircraft communications during a particular flight based on the current aircraft state, environment and the current airline costs, thereby reducing the costs associated with unwanted or unnecessary aircraft communications. The disclosed methodology also enables aircraft communications to be refined to an area of interest or event where greater communication is desired, e.g., during descent or climb.

One aspect of the invention is a method for remotely setting a value for a trigger threshold variable used by a computer onboard an aircraft to determine if and when a data message should be transmitted from the aircraft. The method comprises: (a) obtaining electronic data representing flight information and a current or predicted flight plan or flight trajectory of the aircraft; (b) obtaining electronic data representing business considerations; (c) computing a value of the trigger threshold variable as a function of at least the flight information and flight plan or flight trajectory data and the business considerations data; and (d) constructing a trigger threshold data message containing the computed value of the trigger threshold variable.

Another aspect of the invention is a system for remotely setting a value for a trigger threshold variable used by a computer onboard an aircraft to determine if and when a data message should be transmitted from the aircraft. The system comprises a processor system programmed to perform operations (a) through (d) set forth in the preceding paragraph.

A further aspect of the invention is a method for remotely setting a plurality of values for trigger threshold variables used by a computer onboard an aircraft to determine when data messages should be transmitted from the aircraft. The method comprises the following steps: (a) obtaining data representing flight information and a current or predicted flight plan or flight trajectory of the aircraft; (b) obtaining electronic data representing business considerations; (c) computing a plurality of values of the trigger threshold variable as a function of at least the flight information and flight plan or flight trajectory data and the business considerations data; and (d) constructing a trigger threshold data message containing the plurality of computed values of the trigger threshold variable.

Other aspects of the invention are disclosed and claimed below.

BRIEF DESCRIPTION OF THE DRAWINGS

Various embodiments will be hereinafter described with reference to drawings for the purpose of illustrating the foregoing and other aspects of the invention.

Reference will hereinafter be made to the drawings in which similar elements in different drawings bear the same reference numerals.

DETAILED DESCRIPTION

Figures 1, 1A:
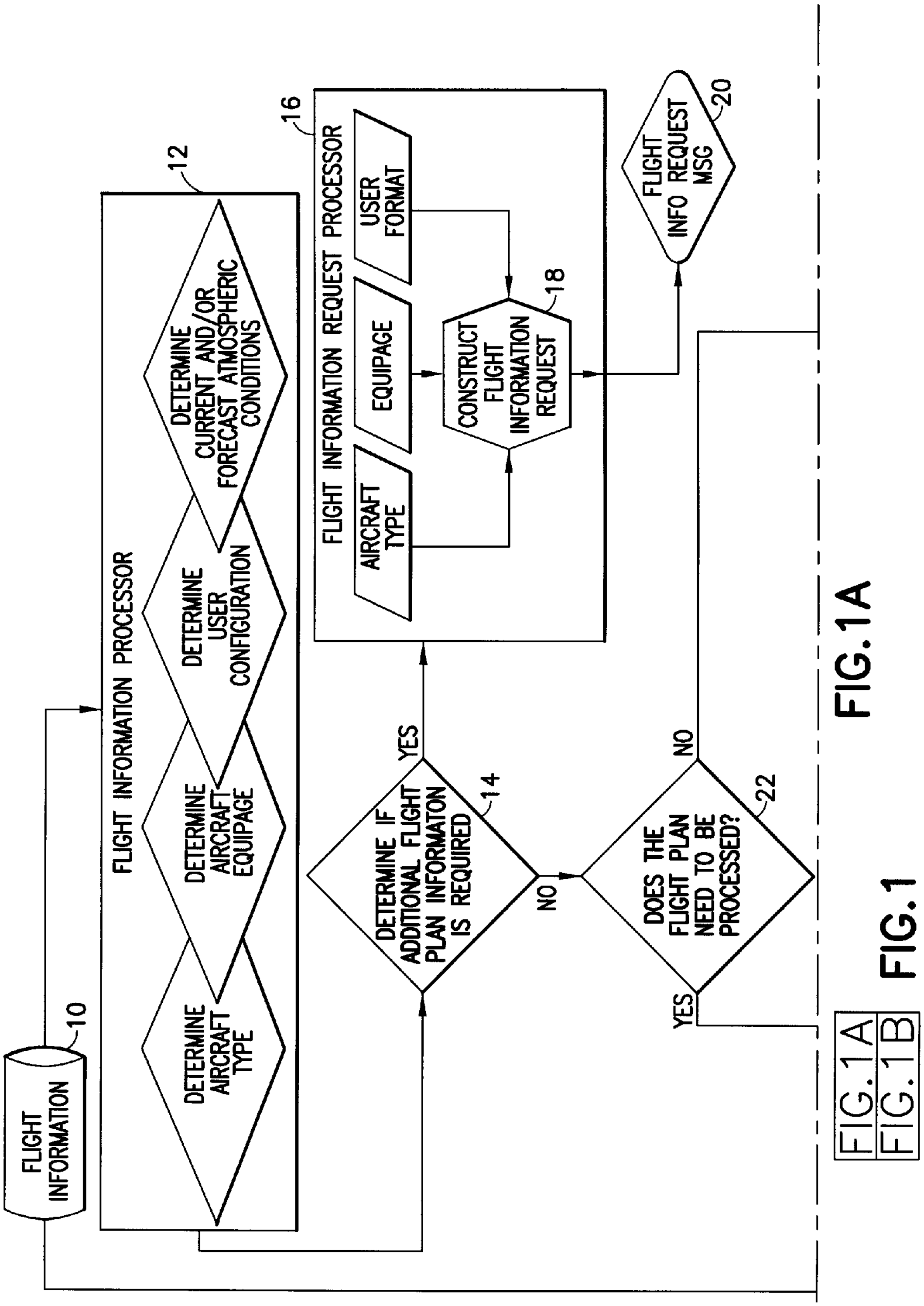
FIG. 1 consists of FIGS. 1A and 1B, which taken together form a diagram showing components of a system for changing the value of an ETA change variable in accordance with one embodiment.

In accordance with the disclosed embodiments, the aircraft is flying with a basic definition of one or more reports to transmit when respective triggers are met. The "report" can be anything specified by the user and can vary from trigger to trigger. In particular, the transmitted message may contain any specified parameter or sequence of parameters, such as position, flight progress, flight plan, times, fuels, etc. However, there may be situations where the triggers are not initialized or their magnitudes are set to such high values that the triggers become pointless. In accordance with the methodology disclosed herein, a ground station sends a message up to the aircraft, which message sets one or more trigger thresholds. Thereafter, when the thresholds are met or exceeded, the aircraft will transmit respective report messages. For the sake of illustration, four exemplary triggers will now be described. However, the scope of the invention should not be limited to these examples. A trigger threshold can be selected and associated with any parametric variable that is calculated or measured onboard the aircraft.

In accordance with one exemplary embodiment, a set value of a wind magnitude difference variable is used as a trigger for transmitting a report in accordance with a report configuration file associated with this trigger. When a waypoint is sequenced, the flight management computer (FMC) onboard the aircraft computes the magnitude of the difference vector between the entered wind vector at that waypoint and the actual wind vector at that waypoint as measured by sensors onboard the aircraft. If the magnitude of the wind difference vector at a waypoint equals or exceeds a corresponding trigger threshold variable value previously transmitted in a data message, a report is generated and transmitted as defined per the associated report configuration file.

In accordance with another exemplary embodiment, a set value of an ETA (Estimated Time of Arrival) change variable is used as a trigger for transmitting a report in accordance with a report configuration file associated with this trigger. When the destination ETA changes by an amount equal to or greater than a corresponding trigger threshold variable value, the FMC will transmit a report as defined per the associated report configuration file.

In accordance with a further exemplary embodiment, a set value of a Waypoint ETA variable is used as a trigger for transmitting a report in accordance with a report configuration file associated with this trigger. When a waypoint ETA minus FMC system time becomes equal to or less than a corresponding trigger threshold variable value, the FMC will transmit a report as defined per the associated report configuration file. It is possible to define multiple different reports, each triggered by a different value of the Waypoint ETA variable.

In accordance with additional exemplary embodiments, a set value of a time to go to a point or altitude variable is used as a trigger for transmitting a report in accordance with a report configuration file associated with this trigger. For example, when a time to go (or simply referred to as a time) to a location variable is set to 60 minutes, then a report message is triggered when the time to the specified location becomes less than 60 minutes. Or, in accordance with another example, when a time to go to reach a predetermined altitude (e.g., 35,000 ft) variable is set to 5 minutes, then a report message is triggered when the time to reach the predetermined altitude becomes less than 5 minutes.

For the purpose of illustration, components of a system for providing updated ETA change variable values to an aircraft will now be described with reference to FIGS. 1 and 2. In addition or in the alternative, the same system can be programmed to remotely set the values of one or more other trigger threshold variables, such as the wind magnitude difference variable and the Waypoint ETA variable briefly described above.

Figure 1B:
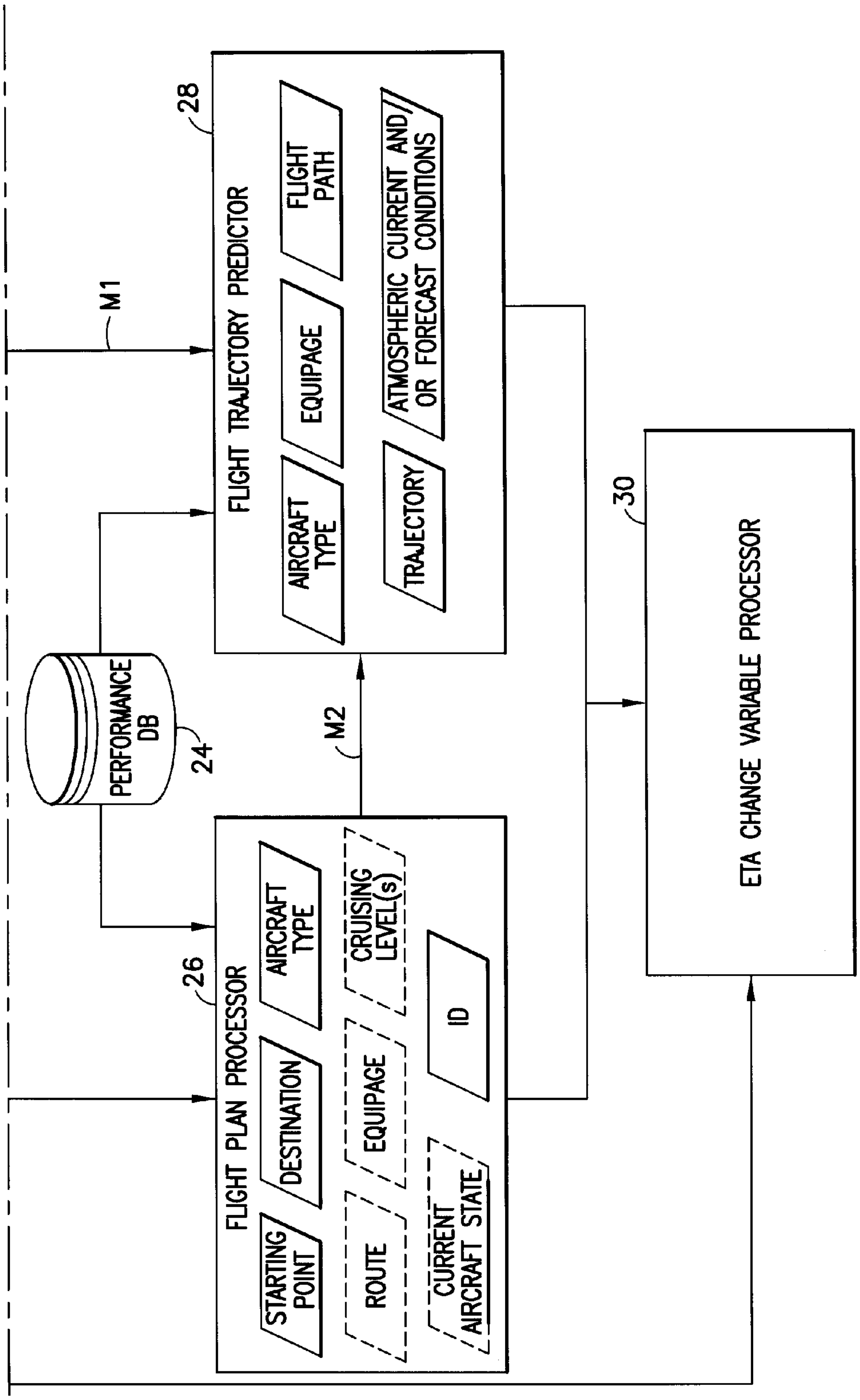

FIG. 1, which consists of two parts respectively labeled FIG. 1A and FIG. 1B, shows components of a system in accordance with one exemplary embodiment. Referring first to FIG. 1A, the system comprises a flight information processor 12 which receives and processes flight information 10. (The flight information 10 is also sent to an ETA change variable processor 30, seen in FIG. 1B and to be described in detail later with reference to FIG. 2.) Flight information 10 can be transmitted in any one of a number of ways and may comprise a multiplicity of flight data items. In particular, it may comprise a flight plan, a flight trajectory, aircraft state data or any combination thereof. The flight information processor 12 processes the flight information, creating a flight record (hereinafter referred to as a "flight object") which is tagged to the specific aircraft. The flight object is a generic container comprising a multiplicity of fields populated with flight information, such as elements of flight plans, flight routes, flight trajectories, aircraft position, aircraft altitude, aircraft speed, etc.

During processing of the flight information, the flight information processor 12 determines the aircraft type, the aircraft equipage, the user configuration for the airline that operates the aircraft, and the current and/or forecast atmospheric conditions. The user configuration specifies which functions or processes are running in parallel, and also defines connections to receive and transmit the data from the processors or databases shown in FIG. 1. The user configuration also specifies the behavior of the application.

From the received flight information data and perhaps even previously received data, a determination is made (logical step 14 in FIG. 1A) whether additional flight plan information is required. Based on this decision, a flag is set for other processors to act on their functions. Logical step 14 may be performed by the flight information processor 12.

If the decision is made that additional flight plan information is required, a flight information request processor 16 carries out the basic function of constructing the request message (step 18 in FIG. 1A) to send to the aircraft or end user and concludes by initiating the transmission of a flight information request message 20 addressed to the aircraft or end user. The format and encoding of the flight information request message 20 is dependent on the aircraft type, its equipage and the message format specified by the user. The user message format generally pertains to the order and type of data and usually does not encompass the behavior of the application. In some situations it is advantageous to break the actual transmission out into a separate transmission so the message may be validated and security protocol added. More specifically, if the flight information request message 20 is being sent to a ground-based operations center, the message may be transmitted in one burst. In addition, if the message is also being sent to an aircraft, at the same time that the message is being sent to the operations center, the message needs to be separated into multiple message parts for transmission.

In the event that additional information is not needed, then a determination is made (logical step 22 in FIG. 1A) whether the flight plan needs to be processed. Logical step 22 may be performed by a flight plan processor 26 (seen in FIG. 1B). If the flight plan information needs to be processed, the flight plan processor 26 begins to execute a program for computing a flight path based on the aircraft identifier, aircraft type, starting point, destination, route, equipage, cruising level, current aircraft state and data from performance database 24, which stores specific performance data for the particular aircraft type and, in rare instances, for the particular airframe. The specific data stored in performance database 24 varies for different aircraft types and may include specific performance parameters such as drag coefficients, thrust ratings, lift coefficients, fuel burn coefficients and so forth.

If the flight plan information does not need to be processed, then a message M1 is sent to a flight trajectory predictor 28 (which is also a processor) informing the latter that the flight plan is available in the flight object for processing.

If the flight information needs to be processed, then the flight plan processor 26 will compute a flight path (e.g., a list of waypoints, cruise altitude, speed schedule), store that flight path in fields of the flight object (where it is available for use by the flight trajectory predictor 28) and send a message M2 to the flight trajectory predictor 28 informing the latter that the flight path is available for processing. The flight trajectory predictor 28 can then retrieve that flight path information from the flight object (and optionally, also retrieve performance data from database 24) for use in calculating an updated predicted flight trajectory based at least in part on the flight path, the original flight trajectory, the aircraft type and how it is equipped, and current and/or forecast atmospheric (i.e., environmental) conditions.

If an updated flight trajectory prediction is not necessary (i.e., there is sufficient flight information available), then the flight plan processor 26 will still compute the flight path, store it in the flight object (where it is available for use by an ETA change variable processor 30) and send a message to the ETA change variable processor 30 informing the latter that the flight path is available in the flight object for processing. As seen in FIG. 1B, the flight plan processor 26 uses various inputs such as the starting point, destination, aircraft type and aircraft identifier. Optionally, the flight plan processor 26 also receives the route, equipage, cruising level(s) and current aircraft state. All of these are fields in the flight object.

The flight trajectory predictor 28 receives or retrieves either a flight path or a flight trajectory. Its basic function is to compute a flight trajectory prediction based on the given flight information, store that updated predicted flight trajectory in the flight object, and then send a message to the ETA change variable processor 30 indicating that the updated predicted flight trajectory is available for processing. The flight object can receive a flight trajectory or flight plan from any source internal or external. The preferred method is for flight information to be processed through the flight information processor 12 but if the incoming data meets the predefined user configuration and user format, it can be directly fed into the flight object, where it is available for use by the flight trajectory predictor 28 and the ETA change variable processor 30.

Alternatively, instead of sending a message to the ETA change variable processor 30, the flight object can be sent to the ETA change variable processor 30 or a flag can be set which indicates to the ETA change variable processor 30 that the flight object is available for retrieval.

Figure 2:
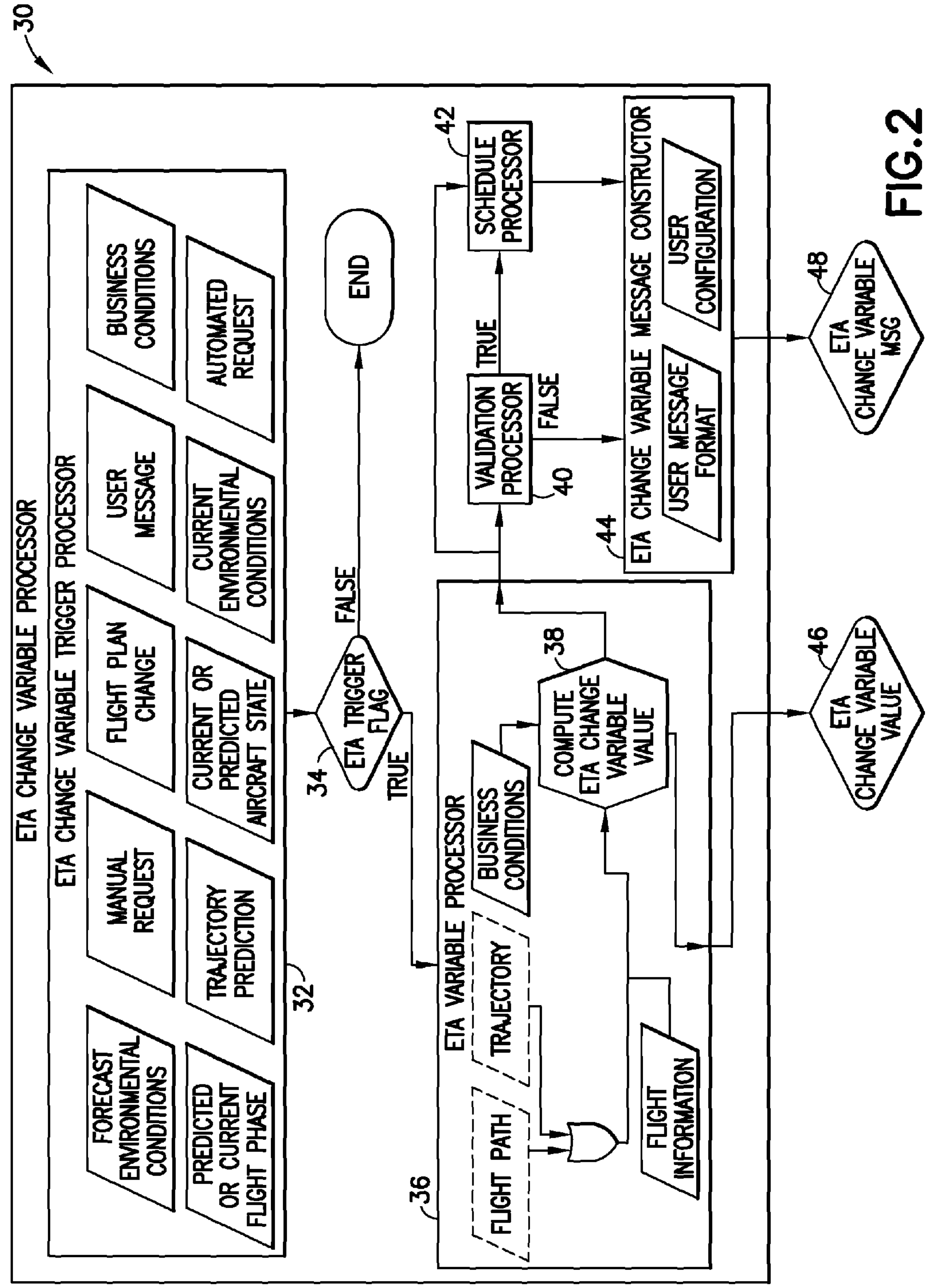
FIG. 2 is a diagram showing components of the ETA change variable processor seen in FIG. 1.

FIG. 2 shows one exemplary embodiment of components of an ETA change variable processor in accordance with the embodiment depicted in FIG. 1. The ETA change variable processor 30 comprises an ETA change variable trigger processor 32, an ETA variable processor 36, a validation processor 40, a schedule processor 42 and an ETA change variable message constructor 44. In accordance with other embodiments, the ETA change variable processor 30 at a minimum includes the functionality of the ETA variable processor and the functionality of the ETA change variable message constructor, which functionalities could be combined in one processor. The ETA change variable processor 30 determines the current value of the ETA change variable stored onboard the aircraft and under certain conditions, computes a new value based on the flight information 10 and business considerations.

Still referring to FIG. 2, the outputs 46 and 48 of the ETA change variable processor 30 are dependent upon its configuration. For example, if configured for test, the ETA change variable processor 30 could output a proposed ETA change variable value 46 prior to message construction and validation. In this mode the proposed ETA change variable value could be for display and logging purposes. The ETA change variable processor 30 may also produce the actual ETA change variable message 48 for transmission if configured to perform the message construction tasking.

The ETA change variable trigger processor 32 can receive or retrieve flight information, a flight plan, a flight trajectory, a flight trajectory prediction, and predicted or current flight phase or aircraft state from the flight object. The ETA change variable trigger processor 32 also can access databases containing data representing current and forecast environmental conditions and business conditions (such as communications costs as a function of aircraft position, time of day, etc.). It can also receive user messages and manual or automated requests for an updated ETA change variable.

Before computing a new value for the ETA change variable, the ETA change variable trigger processor 32 first tries to determine the current value stored in the aircraft's FMC. There are a number of methods that can be utilized to determine the current value. Alternatively, there are a number of different situations in which the ETA change variable trigger processor 32 can deduce the current value and then verify it.

For example, assume that at power-up an aircraft loads a default value. The default value is known and stored locally. The default value can be verified by the first message received from the aircraft. If the first message received from the aircraft does not match the expected type of message, then an alternative method can be used to determine the default value. For example, some other user could have changed the default value. In this situation, the ETA change variable trigger processor 32 must first recognize that this condition exists and then needs to determine that value. This can be done in a number of ways. (1) A message can be sent requesting the current value (not preferred because it may increase communication cost). (2) The current value can be derived from data in previously transmitted reports. (3) The ETA change variable trigger processor 32 can obtain the data value from internal or external users. The method chosen varies per aircraft type and airline configuration. In accordance with a fourth option, the ETA change variable processor 30 does not bother to determine the current value and overrides it by transmitting a new value. Whenever an ETA change variable value is transmitted to an aircraft or any user, that value is stored locally as the current value, so in most instances there should be little difficulty in determining what the current value of the ETA change variable is onboard a particular aircraft or in use by a user.

Based on at least some of the foregoing information, ETA change variable trigger processor 32 determines whether a new value for the ETA change variable should be calculated and sets an ETA trigger flag 34 to True if a new value should be calculated. If not, the flag is set to false.

The ETA trigger flag 34 will be set to True in response to one or more conditions being satisfied. For example, the flag will be set to True in response to one or a combination of the following conditions: a change in costing structure, current aircraft flight phase, a maneuver, reaching a predetermined location or predetermined altitude, and receipt of a manually requested or transmitted message from the aircraft.

In response to the ETA trigger flag being set to True, the ETA variable processor 36 is triggered to begin its processes and output its solution. Based on flight information, business conditions and either the flight path or flight trajectory, the ETA variable processor 36 computes a proposed ETA change variable value (step 38 in FIG. 2) representing the minimum change in estimated time of arrival which will trigger the transmission of a data message in a form dictated by an associated report configuration file. The ETA variable processor 36 will not be triggered if the ETA trigger flag was set to False in step 34.

Once triggered, the ETA variable processor 36 begins the process of determining the current value of the ETA change variable and computing a proposed value based on flight information, business conditions and either the flight path or flight trajectory. The proposed ETA change variable value 46 is then output for display and logging.

The proposed value may then be run through for validation and scheduling. A validation processor 40 and a schedule processor 42 both receive the proposed ETA change variable value. The validation processor 40 determines the validity of the proposed ETA change variable value. An example of an invalid value may be a value which is out of bounds, the same value as the current value previously determined, or imposed transmission limitations. If the proposed ETA change variable value is valid, the validation processor sends a True signal (or sets a True flag) to the schedule processor 42. If the proposed ETA change variable value is not valid, the validation processor sends a False signal (or sets a False flag) to an ETA change variable message constructor 44. In response to a determination that the proposed value is not valid, the message constructor does not construct a message.

In response to a determination that the proposed value is valid, the schedule processor 42 determines when and where a message containing the new value should be transmitted. The message may be sent immediately, upon the occurrence of a condition or based on a schedule. The schedule processor is important in instances where the message needs to be transmitted to an aircraft, but may be less important if the message is going to an operations center on the ground or another user. The current aircraft state or conditions may prohibit the reception of a message; in this case, the message would be scheduled for a later more opportune time or at a specific location.

If configured, the purpose of the ETA change variable message constructor 44 is to construct a message specific to the end user based on a desired message format for transmission. The ETA change variable message constructor 44 can formulate the message based on a single end user or multiple end users. For example, if the new value for the ETA change variable was invalid, the message would be constructed for output only for display and logging.

The ETA change variable message constructor 44 receives the new value from schedule processor 42 and, at the opportune time as dictated by the scheduler processor, creates the actual message to be transmitted. The message is constructed in a message format specified by the message user in accordance with a dynamically settable user configuration stored in a user preferences database. Alternatively, if the user configuration is absent or unavailable, the system dynamically determines how to format the message based on the origin of the request, the type of information, the aircraft type, the airline operating the aircraft or other information. In either case, the message constructor 44 sends the constructed message to a transmitter (not shown) that will transmit the message to the proper user. For example, the resulting ETA change variable message 48 can be transmitted to either the appropriate aircraft or ground system in the correct format. The ETA change variable message 48 will also be persisted (i.e., stored) in order to be used in future ETA change variable calculations for that particular aircraft.

In a typical case, an ETA change variable message addressed to an aircraft is sent from an airline's computer system to a datalink service provider's main computer system. The datalink service provider then transmits the message over its ground network to a remote ground station that broadcasts the message to the aircraft. The MU onboard the aircraft then validates the aircraft identifier and either processes the message or forwards it to the FMS for processing.

The system disclosed above provides automation to dynamically set the ETA change variable or any other trigger threshold value onboard an aircraft. This system provides the opportunity to dynamically set a trigger threshold variable based on business considerations, user preference, and either the flight path or flight trajectory, where previously it was a static value.

To illustrate how dynamic setting of an ETA change variable can be utilized in practical situations, two examples will be discussed. Background information for these examples is as follows: Suppose that an aircraft transmits a message. In that message, the system shown in FIGS. 1 and 2 can derive that the aircraft is currently in VHF communication mode. From the route (origin to destination), the system can also derive what changes in communication will take place.

Example 1

The aircraft is at a gate in Seattle and is flying to Honolulu. While the aircraft is in the vicinity of Seattle, it will use a VHF communication mode. However, while en route to Hawaii, the aircraft will switch into a Satellite or HF communication mode. According to the rules of this particular airline, the communication messaging, particularly progress reports, must be reduced due to the increased costs associated with satellite or HF communications. To reduce communications, the system disclosed above increases the value of the ETA change variable. Later, as the aircraft approaches Hawaii, it is once again in the VHF communication mode and normal reporting is requested, the value of the ETA change variable would be changed back to its original value or might be reduced to a value greater than the original value.

Example 2

In this example, the airline is not concerned with which communication medium is being used, but is most concerned with the proper messaging around phases of flight or maneuvering. Using the same route of Example 1, the aircraft leaves Seattle and the ETA change variable is left at its default value (e.g., greater than 2 minutes). As the aircraft approaches Hawaii, this particular airline has requested an increase in communication frequency because the airport in Honolulu frequently has delays. The value of the ETA change variable is reduced, for example, to 2 minutes and the aircraft messaging increases. After landing in Hawaii, the aircraft turns around and is now en route to Seattle. The system would reset the value back to the climb or en route value.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention.

As used in the claims set forth hereinafter, the term "processor system" encompasses a single processor or multiple processors. Also, the method claims set forth hereinafter should not be construed to require that all steps of the method be performed in alphabetical order or in the order in which they are recited.

The invention claimed is:

1. A method, performed by a processor, for dynamically changing a value for a trigger threshold variable used by a flight management computer onboard an aircraft to determine if and when a data message should be transmitted from the aircraft during a flight, comprising:

(a) obtaining electronic data representing flight information and a flight plan or flight trajectory of the aircraft;

(b) obtaining electronic data representing communications cost information;

(c) dynamically computing a value of the trigger threshold variable as a function of at least the flight information and flight plan or flight trajectory data and the communications cost information; and (d) constructing a trigger threshold data message containing said computed value of the trigger threshold variable.

2. The method as recited in claim 1, wherein operations (a) through (d) are performed in response to one of or a combination of the following: a change in costing structure, current aircraft flight phase, a maneuver, reaching a predetermined location or predetermined altitude, and receipt of a manually requested or transmitted message from the user.

3. The method as recited in claim 1, wherein the trigger threshold variable value is a number representing a specified change in estimated time of arrival of the aircraft that will trigger the transmission of a data message from the aircraft.

4. The method as recited in claim 1, wherein the trigger threshold variable value is a number representing a specified time for the aircraft to go to a predetermined point or altitude that will trigger the transmission of a data message from the aircraft.

5. The method as recited in claim 1, wherein the trigger threshold variable value is a number representing a specified wind magnitude difference that will trigger the transmission of a data message from the aircraft.

6. The method as recited in claim 1, wherein the trigger threshold variable value is a number representing a specified difference between an estimated time of arrival of the aircraft and a current time that will trigger the transmission of a data message from the aircraft.

7. The method as recited in claim 1, further comprising determining a current value of the trigger threshold variable stored in the onboard computer prior to performing operation (c).

8. The method as recited in claim 1, wherein operation (c) comprises computing a flight path or flight trajectory data as a function of at least said flight plan data.

9. The method as recited in claim 1, further comprising determining the validity of the computed value of the trigger threshold variable.

10. The method as recited in claim 9, further comprising sending the trigger threshold data message to the flight management computer.

11. A method, performed by a processor, for dynamically changing a plurality of values for a trigger threshold variable used by a flight management computer onboard an aircraft to determine when data messages should be transmitted from the aircraft during a flight, comprising:

(a) obtaining data representing flight information and a flight plan or flight trajectory of the aircraft;

(b) obtaining data representing communications cost information;

(c) dynamically computing a plurality of values of the trigger threshold variable as a function of at least the flight information and flight plan or flight trajectory data and the communications cost information; and (d) constructing a trigger threshold data message containing said plurality of computed values of the trigger threshold variable.

12. The method as recited in claim 11, wherein steps (a) through (d) are performed in response to one of or a combination of the following: a change in costing structure, current aircraft flight phase, a maneuver, reaching a predetermined location or predetermined altitude, receipt of a manually or automatically requested message, or a transmitted message from the aircraft.

13. The method as recited in claim 11, wherein each trigger threshold variable value is a number representing a specified difference between an estimated time of arrival of the aircraft and a respective current time that will trigger the transmission of a data message from the aircraft.

14. The method as recited in claim 11, wherein each trigger threshold variable value is a number representing a respective specified time for the aircraft to go to a predetermined point or altitude that will trigger the transmission of a data message from the aircraft.

15. The method as recited in claim 11, further comprising sending the trigger threshold data message to the flight management computer.

16. A system for dynamically changing a value for a trigger threshold variable used by a flight management computer onboard an aircraft to determine if and when a data message should be transmitted from the aircraft during a flight, comprising a processor system programmed to perform the following operations:

(a) obtaining data representing flight information and a flight plan or flight trajectory of the aircraft;

(b) obtaining data representing communications cost information;

(c) dynamically computing a value of the trigger threshold variable as a function of at least the flight information and flight plan or flight trajectory data and the communications cost information; and (d) constructing a trigger threshold data message containing said computed value of the trigger threshold variable.

17. The system as recited in claim 16, wherein operations (a) through (d) are performed in response to one of or a combination of the following: a change in costing structure, current aircraft flight phase, a maneuver, reaching a predetermined location or predetermined altitude, and receipt of a manually or automatically requested message or transmitted message from the aircraft.

18. The system as recited in claim 16, wherein the trigger threshold variable value is a number representing one of the following: a specified change in estimated time of arrival of the aircraft that will trigger the transmission of a data message from the aircraft; a specified wind magnitude difference that will trigger the transmission of a data message from the aircraft; a specified difference between an estimated time of arrival of the aircraft and a current time that will trigger the transmission of a data message from the aircraft; and a specified time for the aircraft to go to a predetermined point or altitude that will trigger the transmission of a data message from the aircraft.

19. The system as recited in claim 16, further comprising determining a current value of the trigger threshold variable stored in the onboard computer prior to performing operation (c).

20. The system as recited in claim 16, wherein operation (c) comprises computing a flight path as a function of at least said flight plan data.

21. The system as recited in claim 16, further comprising determining the validity of the computed value of the trigger threshold variable.

22. The system as recited in claim 21, further comprising sending the trigger threshold data message to the flight management computer.

* * * * *